US012646422B2

(12) United States Patent
Sternberg et al.

(10) Patent No.: US 12,646,422 B2
(45) Date of Patent: Jun. 2, 2026

(54) METHOD AND SYSTEM FOR SIMULATING HANDLING OF RADIOACTIVE MATERIAL SAFETY DURING TRAINING

(71) Applicant: TRIAD National Security, LLC, Los Alamos, NM (US)

(72) Inventors: Kyle Matthew Sternberg, Los Alamos, NM (US); George Andrew Erickson, Los Alamos, NM (US)

(73) Assignee: TRIAD NATIONAL SECURITY, LLC, Los Alamos, NM (US)

( * ) Notice: Subject to any disclaimer, the term of this patent is extended or adjusted under 35 U.S.C. 154(b) by 419 days.

(21) Appl. No.: 18/222,878

(22) Filed: Jul. 17, 2023

(65) Prior Publication Data

US 2024/0038096 A1     Feb. 1, 2024

Related U.S. Application Data

(60) Provisional application No. 63/392,271, filed on Jul. 26, 2022.

(51) Int. Cl.
G09B 23/20        (2006.01)
G09B 5/04         (2006.01)

(52) U.S. Cl.
CPC .............. G09B 23/20 (2013.01); G09B 5/04 (2013.01)

(58) Field of Classification Search
CPC .................................. G09B 23/20; G09B 5/04
See application file for complete search history.

(56) References Cited

U.S. PATENT DOCUMENTS

| | | | | | |
|---|---|---|---|---|---|
| 3,641,507 | A | * | 2/1972 | Kosaka | G09B 5/04 |
| | | | | | 434/320 |
| 3,733,443 | A | * | 5/1973 | Iwawaki | G09B 5/04 |
| | | | | | 360/73.02 |
| 4,172,329 | A | * | 10/1979 | Chen | G09B 19/06 |
| | | | | | 434/319 |
| 4,737,134 | A | * | 4/1988 | Rumsey | A63J 17/00 |
| | | | | | 446/175 |
| 7,156,665 | B1 | * | 1/2007 | O'Connor | G09B 11/00 |
| | | | | | 434/323 |
| 7,973,771 | B2 | * | 7/2011 | Geaghan | G06F 3/0446 |
| | | | | | 345/173 |
| 9,195,350 | B2 | * | 11/2015 | Radivojevic | G06F 3/0447 |
| 9,495,010 | B2 | * | 11/2016 | Radivojevic | G06F 3/0418 |

(Continued)

*Primary Examiner* — Xuan M Thai
*Assistant Examiner* — Sadaruz Zaman

(57)            ABSTRACT

A system includes a container filled with material other than radioactive material. The system also includes a capacitor disposed on the container. The capacitor is disposed over a surface of the container. A power source, e.g., 5 V, is used for powering the capacitor that is connected to the power source through a resistor ranging between 20 and 40 mega ohms. A processor is used and configured to generate a feedback based on a measured charging/discharging associated with the capacitor as a user moves with respect to the container. In one nonlimiting example, the processor is configured to generate a rolling average of the charging/discharging. An output device of the system may be configured to render feedback to the user based on the proximity of the user with respect to the container. In some nonlimiting examples, the output device is configured to render the feedback based on the rolling average.

20 Claims, 10 Drawing Sheets

(56)  References Cited

U.S. PATENT DOCUMENTS

| | | | | |
|---|---|---|---|---|
| 9,673,401 | B2 * | 6/2017 | Boudreault | C07D 471/04 |
| 9,733,706 | B2 * | 8/2017 | Beecher | G06F 3/04166 |
| 10,802,658 | B2 * | 10/2020 | Ahne | G06F 3/014 |
| 11,214,008 | B2 * | 1/2022 | Yamazaki | B29C 64/393 |
| 11,270,600 | B2 * | 3/2022 | West | G01T 1/20 |
| 11,611,042 | B2 * | 3/2023 | Adamovich | C07D 213/22 |
| 11,708,356 | B2 * | 7/2023 | Li | H10K 85/622 |
| | | | | 428/690 |
| 12,010,913 | B2 * | 6/2024 | Lee | C07D 403/04 |
| 2005/0091018 | A1 * | 4/2005 | Craft | G07C 5/08 |
| | | | | 703/8 |
| 2011/0281492 | A1 * | 11/2011 | Chan | H03K 17/955 |
| | | | | 446/297 |
| 2013/0106765 | A1 * | 5/2013 | Beecher | G06F 3/0445 |
| | | | | 345/173 |
| 2020/0257384 | A1 * | 8/2020 | Ahne | G06F 3/014 |
| 2021/0116214 | A1 * | 4/2021 | Mock | F41G 1/35 |
| 2024/0038096 | A1 * | 2/2024 | Sternberg | G09B 23/20 |

* cited by examiner

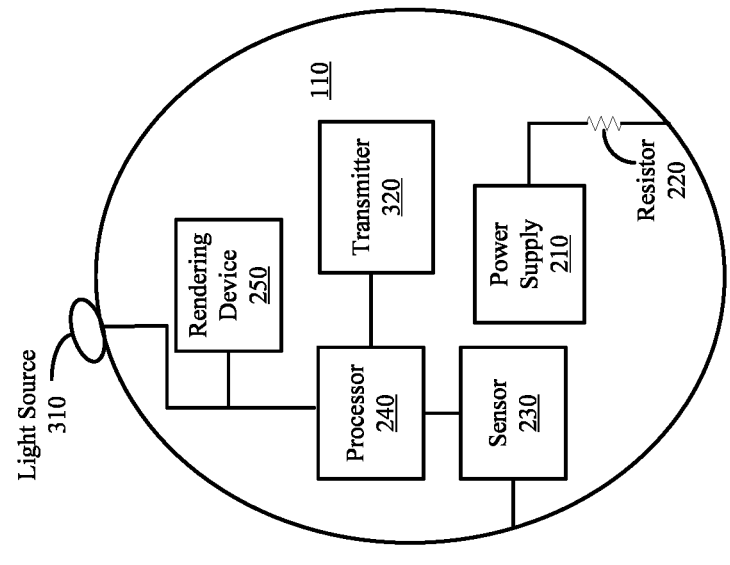
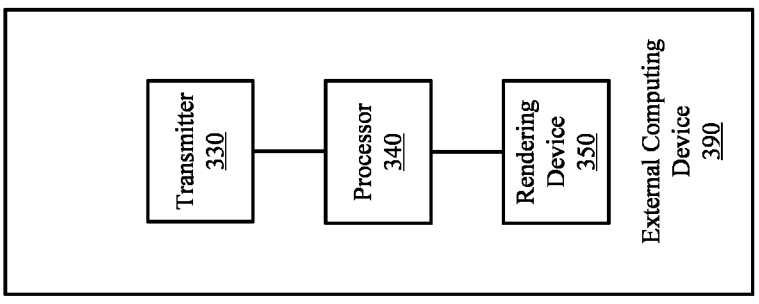
Figure 3B

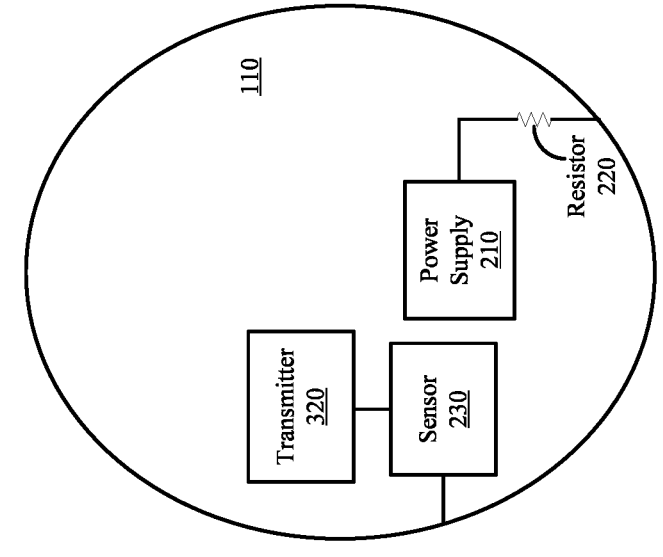
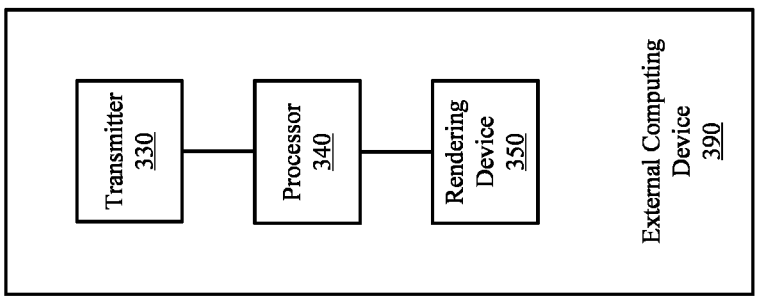
Figure 4

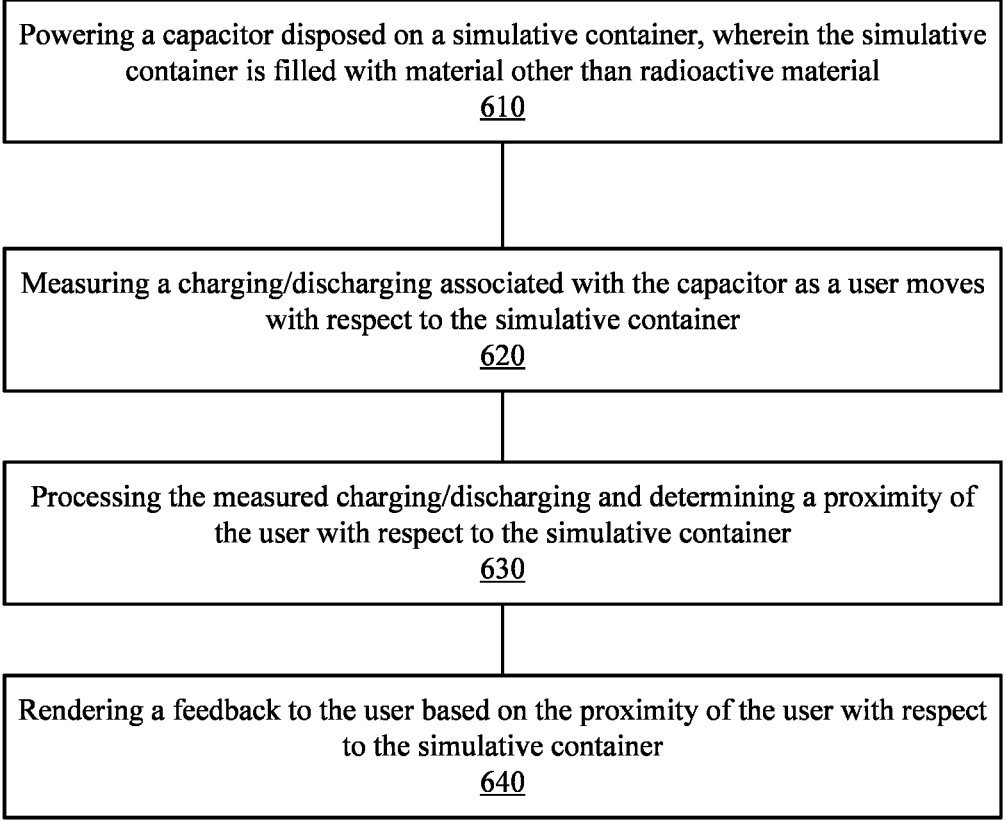

Powering a capacitor disposed on a simulative container, wherein the simulative container is filled with material other than radioactive material
610

Measuring a charging/discharging associated with the capacitor as a user moves with respect to the simulative container
620

Processing the measured charging/discharging and determining a proximity of the user with respect to the simulative container
630

Rendering a feedback to the user based on the proximity of the user with respect to the simulative container
640

Figure 6

METHOD AND SYSTEM FOR SIMULATING HANDLING OF RADIOACTIVE MATERIAL SAFETY DURING TRAINING

RELATED APPLICATIONS

The instant application is a Nonprovisional U.S. Patent Application that claims the benefit and priority to the Provisional U.S. Patent Application No. 63/392,271 that was filed on Jul. 26, 2022, which is incorporated herein by reference in its entirety.

FEDERALLY SPONSORED RESEARCH OR DEVELOPMENT

The United States government has rights in this invention pursuant to 89233218CNA000001 Between the National Nuclear Security Administration (Department of Energy) and Triad National Security, LLC for operation of Los Alamos National Laboratory. The government has certain rights in the invention.

BACKGROUND

Radioactive material may pose extreme risks to a person handling the material or to the general public, if mishandled. As such, extreme precaution must be taken to ensure safety.

Unfortunately, training on how to safely handle a container storing radioactive material in written format is not as effective as training with hands-on-experience, e.g., tactile experience handling the container storing radioactive material and/or feedback. Given the safety concerns, there are very few places where radioactive material are stored, thereby limiting the number of locations where one can be trained and acquire hands-on-experience on how to safely handle radioactive material.

It is appreciated that training with containers filled with non-radioactive material and/or containers that are dissimilar to actual containers that store radioactive material, while safe does not provide a person being trained with the feel, e.g., texture, weight, etc., for handling the actual containers that store radioactive material. For example, the look and feel, the weight and/or form factor of the container (due to the dissimilar material of the container and material within the container) and the feedback (if any) from the container used during training is substantially different from actual containers that store radioactive material. In other words, current training systems are ineffective in training the user with proper touch/feel and/or feedback to safely handle a container storing actual radioactive material.

SUMMARY

Accordingly, a need has arisen to simulate handling of radioactive material in a safe manner for training purposes, e.g., providing a simulative container with an actual look and feel, tactile experience, and feedback that mirrors that of an actual container storing radioactive material. In other words, a need has arisen to provide a simulator to train students to practice techniques and procedures to safely handle radioactive material and to make that experience as real and as realistic as possible. Accordingly, the simulator provides real-time feedback in a classroom environment, with a real look and feel of a container that stores radioactive material. The simulator therefore makes the experience as real as possible while providing a safe learning environment. As such, students can be trained without endangering themselves or the public.

In some embodiments, a system includes a container filled with material other than radioactive material. The system also includes a capacitor disposed on the container. In some embodiments, the capacitor is disposed over a surface of the container. A power source is used for powering the capacitor. In some nonlimiting examples, the power source is a 5V power source and the capacitor is connected to the power source through a resistor ranging between 20 and 40 mega ohms. A processor is used and configured to generate an appropriate feedback based on a measured charging/discharging of the capacitor as a user's hands move relative to the container. In one nonlimiting example, the processor is configured to generate a rolling average of the charging/discharging of the capacitor. An output device of the system may be configured to render feedback to the user based on the proximity of the user with respect to the container. In some nonlimiting examples, the output device is configured to render the feedback based on the rolling average.

It is appreciated that in some embodiments, the container is spherical in shape. The container may comprise Tungsten. In some embodiments, the container is filled with inert material.

In some embodiments, the processor is configured to generate the appropriate feedback response based on a measured speed of the charging/discharging of the capacitor. It is appreciated that the output device is configured to output an audio click rate that increases in frequency as the user moves closer with respect to the container and decreases in frequency as the user moves away with respect to the container to simulate a Geiger counter. In some nonlimiting examples, the output device is configured to output an audio click rate that increases in frequency based on a speed that the user moves closer to the container and decreases in frequency based on a speed that the user moves further away from the container.

It is appreciated that in some embodiments, the output device is a light source positioned on the container and configured to emit light, e.g., blue light. In some embodiments, the light source may flash and a frequency of the flashing depends on the proximity of the user with respect to the container.

These and other features and aspects of the concepts described herein may be better understood with reference to the following drawings, description, and appended claims.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIGS. 3A-3B depict a circuitry associated with a simulation system to provide feedback for training safe handling of radioactive material in accordance with some embodiments.

FIG. 4 depicts another simulation system to provide feedback for training safe handling of radioactive material in accordance with some embodiments.

FIG. 6 shows a nonlimiting example of a flow diagram for providing feedback for training safe handling of radioactive material in accordance with some embodiments.

DETAILED DESCRIPTION

Figure 1B:
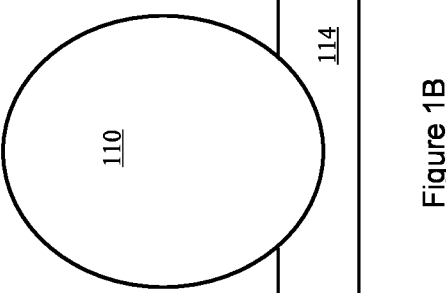
FIGS. 1A-1B depict nonlimiting examples of a spherical container simulator for training safe handling of radioactive material.

The following disclosure provides many different embodiments, or examples, for implementing different features of the subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Before various embodiments are described in greater detail, it should be understood that the embodiments are not limiting, as elements in such embodiments may vary. It should likewise be understood that a particular embodiment described and/or illustrated herein has elements which may be readily separated from the particular embodiment and optionally combined with any of several other embodiments or substituted for elements in any of several other embodiments described herein. It should also be understood that the terminology used herein is for the purpose of describing the certain concepts, and the terminology is not intended to be limiting. Unless defined otherwise, all technical and scientific terms used herein have the same meaning as commonly understood in the art to which the embodiments pertain.

As described, there is a real need to provide a simulative environment to aid in training students to handle radioactive material in a safe manner. The training and the simulative environment would be more effective if it closely mirrors the real life environment, e.g., a simulative container with a weight and/or form factor similar to that of an actual container that stores radioactive material, a tactile experience associated with the simulative container that is similar to that of an actual container storing radioactive material, feedback (e.g., such as click rate associated with a simulative container that is similar to that of an actual container storing radioactive material is used, audio cues, alarm, light going off, light flashing, feedback rendered on a display, etc.), a look and feel of a simulative container that is similar to that of an actual container storing radioactive material is used, a light output associated with a simulative container similar to that of an actual container storing radioactive material is used, etc. In other words, the proposed system provides a simulative environment including a simulative container that look/feels similar to an actual container that stores radioactive material and that it provides feedback similar to that of the actual container storing radioactive material, thereby making the training as real and as realistic as possible. Accordingly, students are provided with hands-on-experience that closely resembles the real life when handling a container storing radioactive material, in a safe manner and within a classroom environment, thereby enabling them to make mistakes during training without endangering themselves or the public. It is appreciated that throughout this application, a container that is used for simulation purposes for training is referred to as simulative container and a container that actually stores a radioactive material is referred to as actual container for storing radioactive material in order to distinguish between the two. However, it is appreciated that a simulative container may in fact be the same container that stores radioactive material. Moreover, it is appreciated that in some nonlimiting examples, the simulative container may be portable in order to facilitate instructions within a classroom environment.

The simulation system being proposed is for training students to handle radioactive material. The proposed simulation system aids in reproducing the handling criteria for radioactive material without actually using radioactive material. Some of those criteria may include placing hand(s) around a radioactive material container that creates safety concerns. The simulation system is designed to teach students, e.g., through feedback, about actions that may cause fatal reaction, etc. The embodiments of the simulation system include a simulative container for training students how to handle radioactive material. The simulative container is described as being a sphere for illustrative purposes and should not be construed as limiting the scope of the embodiments. For example, the simulative container may be a cylindrical container, a cubical container, a donut shaped container, or it may have other form factors. In some nonlimiting examples, the simulative container is spherical and may be 10 cm in diameter. Actual container storing radioactive material may include sensors, e.g., Geiger counter, that outputs a click as a person moves toward or away from the actual container and the click rate may increase as a person's hand moves closer to the container (to alert the person that radiation is higher) and it may decrease as a person's hand moves away from the container (to alert the person that radiation is lower) or it may sound an alarm if radiation exceeds a safety threshold. Similarly, the simulative container includes a circuitry that can detect a person moving closer toward the simulative container or moving away from it. As such, an output feedback, e.g., click rate, is generated with its frequency increasing if the person is getting closer to the simulative container or with its frequency decreasing if the person is moving away from the simulative container in order to mirror the actual container storing radioactive material and its feedback, or it may sound an alarm if it detects that a person's action, if occurred in real life with actual radioactive material, would have caused radiation from the actual container storing radioactive material to exceed a safety threshold. It is appreciated that the frequency may be similar to a gamma/neutron detector (e.g., radiation detector, Geiger counter, etc.) response to radioactive material. In some embodiments, the simulative container includes a light, e.g., blue light, that is positioned underneath the simulative container that is turned on to create a realistic experience of blue radiation on body. In other words, the simulative container creates a simulative environment that provides a look/feel, e.g., tactile feel, weight of the container, etc., and feedback that closely mirror that of an actual container storing radioactive material.

It is appreciated that for training purposes it is more effective to train for a least safe state. A spherical container is generally in a least safe state and creates an unstable geometry. As such, handling a simulative container that is spherical is in a least safe state, thereby more effective environment for students to be trained in. In some embodiments, the simulative container comprising material such as Tungsten is filled with inert material and is placed on a can. In some embodiments, the inert material may be inert gas and may include one or more of helium, nitrogen, neon, argon, krypton, and xenon. In one nonlimiting example, the simulative container may be filled with air. In one nonlimiting example, the weight of the simulative container is similar to that of an actual container storing radioactive material, thereby making the experience as real and as realistic as possible.

In some embodiments, the simulative container includes a circuitry to detect a person moving closer or moving away from the simulative container. In one nonlimiting example, the simulative container includes a capacitor that charges/discharges, as a person moves toward or away from the simulative container. In some embodiments, the surface of the simulative container may be one plate of the capacitor and a person's body may be another. The surface of the simulative container may be powered, e.g., 0 to 5 V, through a large resistor, e.g., 20 to 40 mega ohms. Accordingly, the capacitor may need a long time to charge. As a person moves closer/further from the simulative container the capacitance changes (i.e. charging/discharging) because a person's body is a conductor and changes the capacitance. This information is used by a processor (e.g., microcontroller) to determine how close or far away a person (e.g., a person's hand) is from the simulative container and/or how fast a person is moving toward or away from the simulative container. Moreover, the simulative environment may determine whether a person is placing one or both hands on the simulative container.

It is appreciated that feedback is rendered based on a location of the user with respect to the simulative container, how the user is approaching or moving away from the simulative container (speed), whether a person is touching the simulative container (e.g., one hand and/or both hands), etc. Feedback may be a click rate (generated by a piezo electric speaker for example) that increases in frequency if the person is moving closer to the simulative container or decreases in frequency if the person is moving away. In some embodiments, the feedback may be based on location of the person independent from whether the person is moving toward or away from the simulative container (e.g., a person at 3 ft away may generate 1 click per second whereas a person at 1 ft away may generate 3 clicks per second). It is appreciated that if the simulative environment determines that a person is touching the simulative container, then a constant noise (e.g., click) may be output or an alarm may sound. In yet another embodiment, the simulative container may output a blue light if the system determines that an action has occurred that in real life environment (i.e. actual container storing radioactive material) it would have caused radiation to exceed a safety threshold. Radiation on body is typically blue and as such using a blue light mirrors that of real life and creates an experience that is as realistic to real life interaction with actual container storing radioactive material as possible but in a safe manner.

It is appreciated that the embodiments are described with respect to the surface of the simulative container being a capacitive element for illustrative purposes and should not be construed as limiting the scope of the embodiments. For example, an optical detection system such as a camera may be used to detect a position of a person approaching or moving away from the simulative container and for the processor to process the captured information by the camera to determine the proximity of the person to the simulative container and the speed of approach, as an example to generate a desired output, e.g., click rate, alarm, blue light, etc. In some embodiments, a light detection and ranging (LIDAR) may be used to target a person approaching the simulative container with a laser and to measure the time of reflected light to the receiver in order to determine the positioning, speed, etc., associated with the approach. In yet some embodiments, inductive sensing, radio frequency (RF) sensing, microwave sensing, radar sensing, etc. may be used in order detect a position of a person approaching or moving away from the simulative container.

In some nonlimiting example, a person may wear a glove (coated with metallic material) that acts as one plate of the capacitor and the surface of the simulative container as another plate of the capacitor. It is appreciated that while the embodiments are described with respect to capacitive element charging/discharging to detect person movement with respect to the simulative container, other implementation may be employed. For example, a person handling simulative container may wear a ring that is magnetic and that interacts with the simulative container as the person moves with respect to the simulative container. In one nonlimiting example, the magnetic ring may cause current to flow on the surface of the simulative container as the person wearing the magnetic ring moves (e.g., gets closer, moves away from, etc.) with respect to the simulative container. The generated current may be detected, e.g., using a switch that closes, to indicate that the person is getting closer or is touching the simulative container. As such, the embodiments that are described with respect to capacitive charging/discharging are for illustrative purposes and should not be construed as limiting the scope of the embodiments.

Figure 1A:
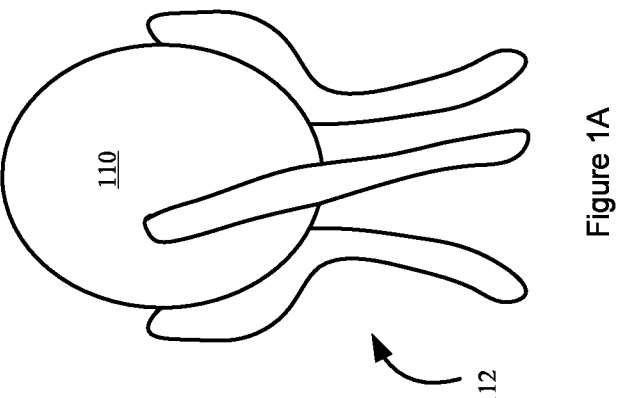

Referring now to FIGS. 1A-1B, nonlimiting examples of a spherical container simulator for training safe handling of radioactive material are depicted. FIG. 1A shows a simulative container 110 (described in greater detail below) that is positioned on legs 112. FIG. 1B shows the simulative container 110 on a base (e.g., can) 114. It is appreciated that the size, form, and composition of the simulative container 110 may be selected to be as close to an actual container storing radioactive material as possible in order to provide a simulative environment that is as realistic as possible. Appropriate selection of material, weight, form factor, etc., for the simulative container 110 provides a look/feel, tactile feel, etc., that is as realistic to actual container with radioactive material as possible, thereby making the training on how to safely handle containers storing radioactive material more effective but in a safe manner. In some embodiments, the simulative container 110 may be formed from Tungsten and it may be filled with inert material. In some embodiments, the simulative container 110 is spherical (as described above) and it may be 10 cm in diameter. It is appreciated that the size, form and composition of the simulative container 110 does effect the capacitance of the capacitor that is used to sense the proximity of the user and/or whether the user is approaching or moving away from the simulative container 110 and the speed of approach.

Figure 2A:
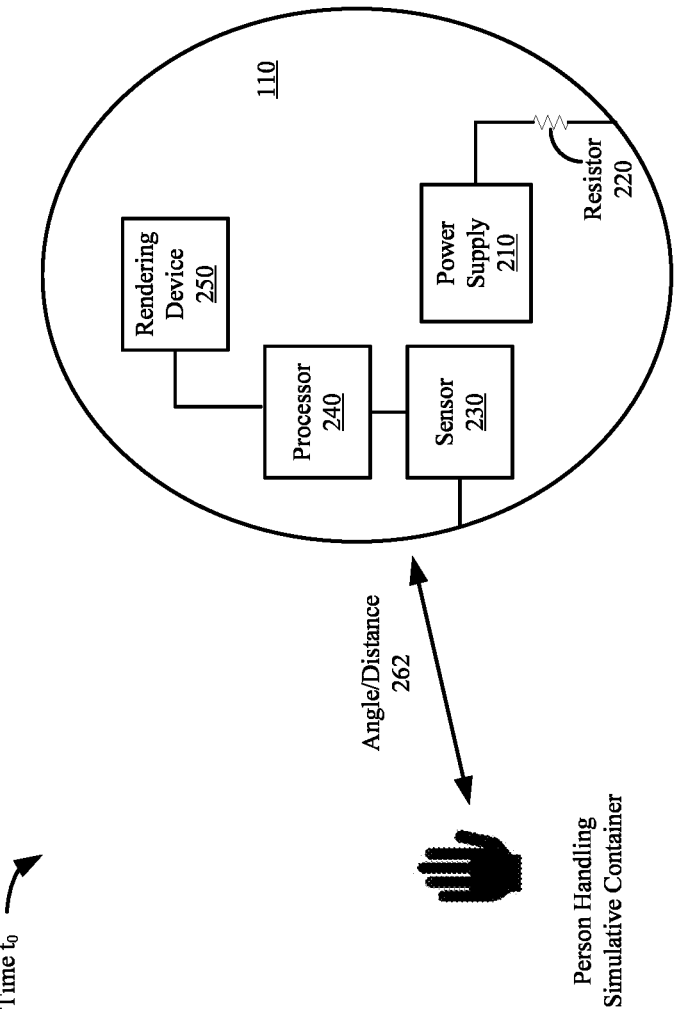
FIGS. 2A-2C depict a simulation system configured to provide feedback for training safe handling of radioactive material in accordance with some embodiments.
Figure 2B:
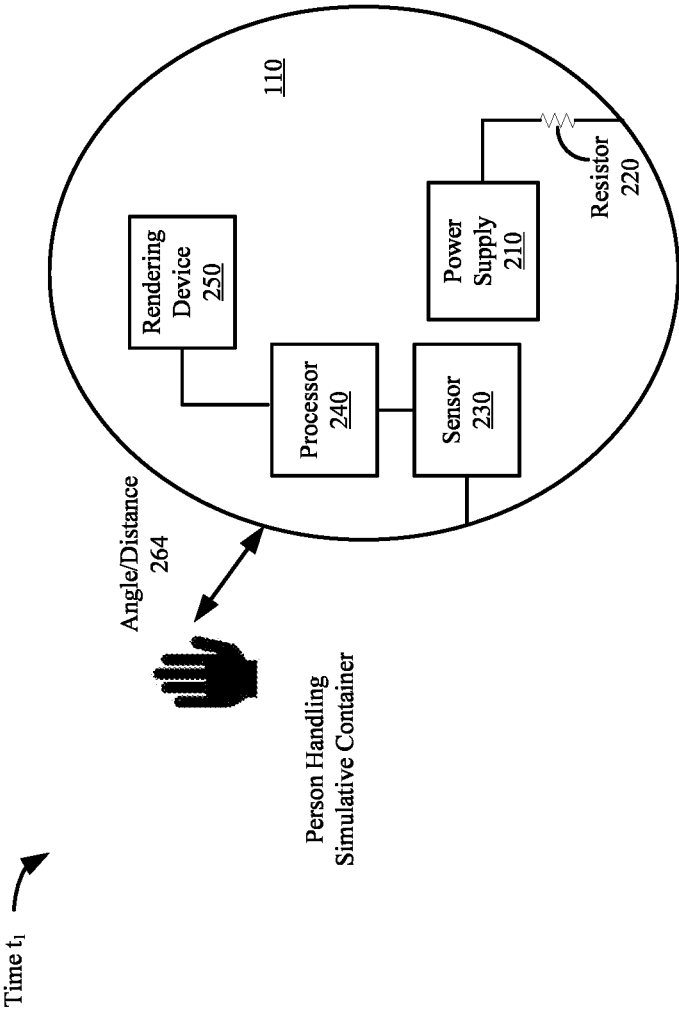
Figure 2C:
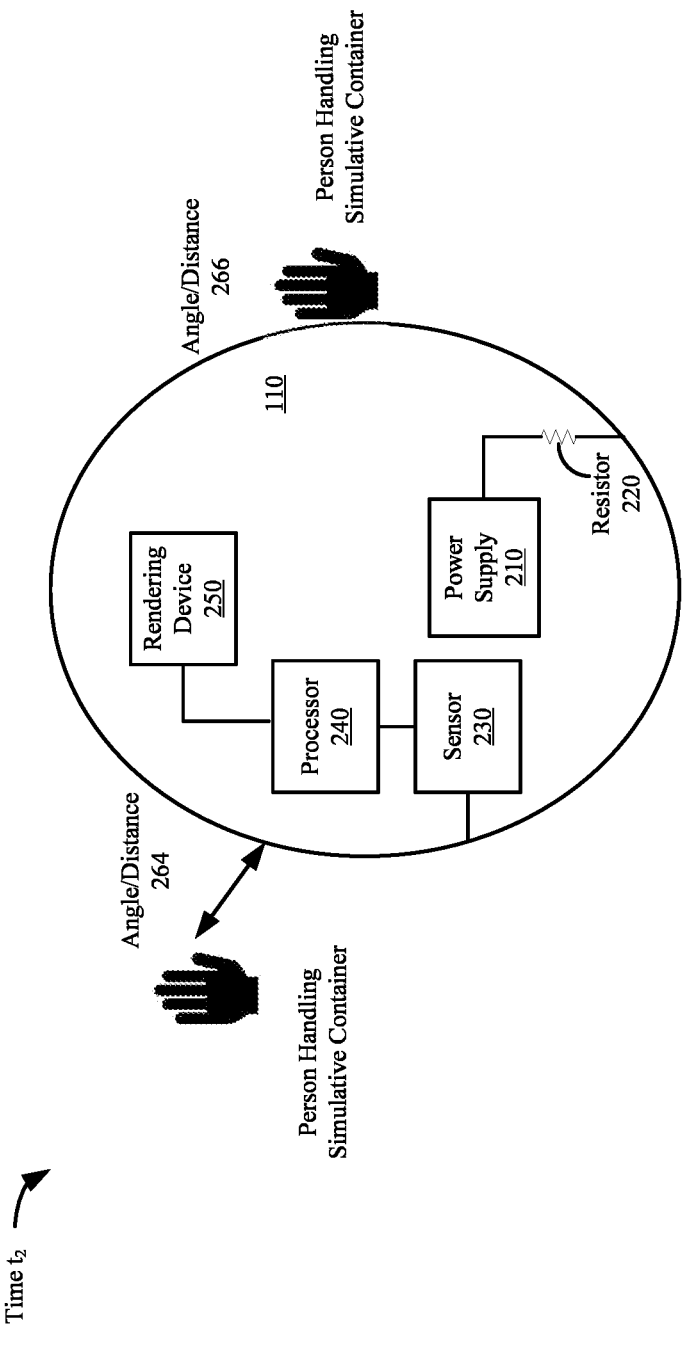

FIGS. 2A-2C depict a simulation system configured to provide feedback for training safe handling of radioactive material in accordance with some embodiments. The simulative container 110 may include a power supply 210, a resistor 220, a sensor 230, a processor 240 (e.g., a microcontroller, a central processing unit (CPU), a Field Programmable Gate Array (FPGA), an Application Specific Integrated Circuit (ASIC), etc.), and a rendering device 250. The power supply 210 may power the sensor 230 through the resistor 220, e.g., ranging between 20-40 mega ohms. The power supply 210 may be a power source that provides a voltage between 0-5 V. The sensor 230 may be a capacitive element, e.g., a surface of the simulative container 110 may operate as a plate of a capacitive element. In one nonlimiting example, the sensor 230 may be disposed on the surface of the simulative container 110 or it may be a portion of the simulative container 110 itself. The power supply 210 powering the sensor 230 may cause the sensor 230 to charge/discharge. It is appreciated that the person handling the simulative container 110 also conducts electrical charge, thereby changes the charge associated with the sensor 230 as the person moves toward or away from the simulative container 110. In other words, the processor 240 may process the amount of charge associated with the sensor 230 or the speed at which the sensor 230 charges/discharges, at time $t_0$, in order to determine the proximity of the person handling the simulative container 110. In some embodiments, the amount of charge and/or its speed of charging/discharging may be associated with not only the proximity of the person handling the simulative container 110 but also the speed at which the person is moving toward or away from the simulative container 110.

In one nonlimiting example, the processor 240 retrieves a previously stored data, e.g., a table associating the electrical charges to distance and/or angle of approach by a person, from a memory component. The processor 240 may then compare the amount of determined charges and/or speed of charging/discharging associated with the sensor 230 to that of the stored table to determine the proximity, e.g., angle/distance 262, of the person handling the simulative container 110 to the simulative container 110. It is appreciated that in some nonlimiting examples, the processor 240 may create a rolling average associated with charging/discharging. It is appreciated that in some embodiments, the comparison may be based on rolling averages in order to smooth out sudden or slow movements.

The processor 240 accesses various safety criteria associated with the angle/distance of the person approaching the simulative container 110 or moving away from it. Based on the criteria and the actual proximity of the person, the processor 240 controls the output of the rendering device 250, e.g., a piezo electric speaker, such as the type of output, e.g., click rate and its frequency, alarm sounding, outputting instructions to the person, etc., to provide feedback to the person. For example, as the person gets closer to the simulative container 110 the processor 240 may control the rendering device 250 to increase the click rate frequency and as the person is moving away it may decrease the click rate frequency. In some examples, the click rate may increase in frequency based on the speed at which the person is moving toward the simulative container 110 and vice versa. In some nonlimiting examples, the rendering device 250 may output cues to the person handling or approaching the simulative container 110, e.g., cue may be to slow down or change the angle of approach or use one or two hands, etc. In one nonlimiting example, once a safety threshold is exceeded, e.g., a person's proximity to the simulative container 110 is less than 1 ft as an example or the speed of approach exceeds a threshold amount, etc., the processor 240 may cause an alarm associated with the rendering device 250 to go off.

Referring now to FIG. 2B, a positioning of the person handling the simulative container 110, at time $t_1$ is depicted. In this example, the person has moved closer to the simulative container 110 and proximity, e.g., angle/distance 264, has changed in comparison to time $t_0$. Since the person's proximity has changed with respect to the simulative container 110, the amount of charge and/or speed of charging/discharging associated with the sensor 230 changes. The processor 240 may process the amount and/or speed of charge/discharge to determine the position of the person with respect to the simulative container 110 and to control the operation of the rendering device 250, e.g., increasing frequency of click rate, decrease frequency of click rate, sound an alarm, provide cues to the person, etc.

Referring now to FIG. 2C, a positioning of the person handling the simulative container 110, at time $t_2$ is depicted. In this example, the person handling the simulative container 110 places his/her second hand on the simulative container 110, thereby making contact with the simulative container 110. Since a hand is placed on the simulative container 110, the amount of charge or speed of charge/discharge changes and processed accordingly by the processor 240. The processor 240 determines that the person has placed a hand on the simulative container 110 and is at a particular proximity, e.g., angle/distance 266. As such, the processor 240 may process the amount and/or speed of charge/discharge to determine the position of the person with respect to the simulative container 110 and to control the operation of the rendering device 250, e.g., increasing frequency of click rate, decrease frequency of click rate, sound an alarm, provide cues to the person, etc.

The embodiments of FIGS. 2A-2C are described with respect to the person handling the simulative container being one plate of the capacitor and the surface of the simulative container being another plate of the capacitor for illustration purposes and should not be construed as limiting the scope of the embodiments. For example, a person handling the simulative container may wear a glove (coated with metallic material) that acts as one plate of the capacitor and the surface of the simulative container as another plate of the capacitor. In another implementation, a person handling simulative container may wear a ring that is magnetic and that interacts with the simulative container as the person moves with respect to the simulative container. In one nonlimiting example, the magnetic ring may cause current to flow in the electrical circuit disposed on the surface of the simulative container or within the simulative container as the person wearing the magnetic ring moves (e.g., gets closer, moves away from, etc.) with respect to the simulative container. The generated current may be detected, e.g., using a switch that closes, or electrical charges stored on a capacitor of the electrical circuit may increase/decrease as the user moves, etc., to indicate that the person is getting closer or is touching the simulative container. It is appreciated that the changes in the electrical charges (increase/decrease) in the electrical circuit (e.g., capacitor within the circuit) or current flowing through the electrical circuit (e.g., may charge/discharge capacitor, close/open switch, etc.) may be used by the processor to generate appropriate feedback, e.g., click rate, sounding alarm, providing clues, etc. The generated feedback is sent to the output device for rendition to the user. As such, the embodiments that are described with respect to capacitive charging/discharging are for illustrative purposes and should not be construed as limiting the scope of the embodiments.

Figure 3A:
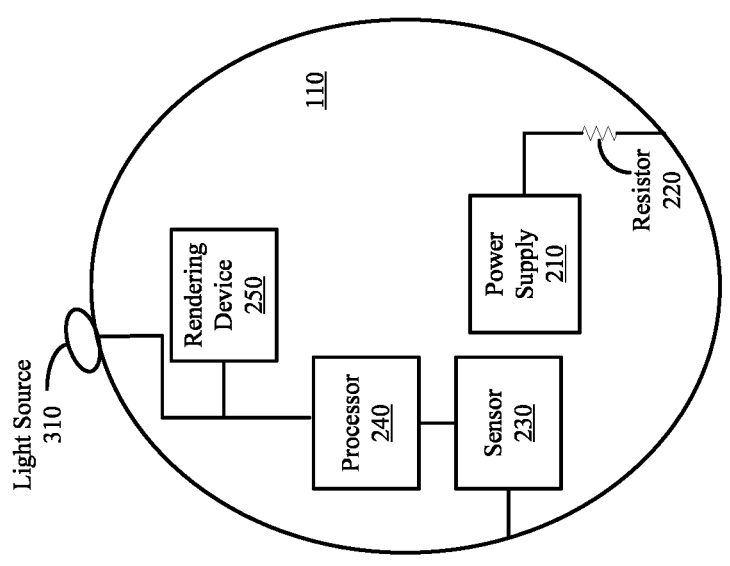

FIGS. 3A-3B depict a circuitry associated with a simulation system to provide feedback for training safe handling of radioactive material in accordance with some embodiments. FIG. 3A shows a simulative container 110 similar to those described in FIGS. 1A-2C. In this nonlimiting example, the simulative container 110 includes a light source 310 that is coupled to the processor 240. The light source 310 may output blue light. It is appreciated that blue light is selected because radiation from radioactive material causes a human body to glow bluish color. The light source 310 is controlled by the processor 240 when a particular safety criteria is exceeded that in real life may cause the amount of radiation to exceed acceptable threshold range. In other words, the processor 240 may determine whether the proximity of the person handling the simulative container 110 would have caused a real container storing radioactive material to emanate radiation beyond the safe threshold and if so then the processor 240 would cause the light source 310 to turn on, e.g., output blue light. In some embodiments, the light from the light source 310 may be a flashing light and in some embodiments, the frequency of flashing may be associated with the level of danger associated with the manner of which the person is handling the simulative container 110. For example, the more dangerously the simulative container 110 is being handled the faster the light flashes and vice versa. The positioning of the light source 310 on top of the simulative container 110 is for illustrative purposes and should not be construed as limiting the scope of the embodiments. For example, the light source 310 may be positioned at the bottom of the simulative container 110.

Referring now to FIG. 3B, a simulative container 110 similar to that of FIG. 3A is shown. In this nonlimiting example, the simulative container 110 includes a transmitter 320 that is configured to send/receive data. As such, data associated with the sensor 230 and processed or partially processed by the processor 240 may be transmitted to an external computing device 390 that receives the data through its transmitter 330. The transmitter 330 then sends the received data to the processor 340 of the external computing device 390 that processes the received data and controls the rendering device 350. In other words, the external computing device 390 that includes the transmitter 330, the processor 340, and the rendering device 350, operate substantially similar to that of the simulative container 110 of FIG. 3A and processes parts or the entire data from the simulative container 110. The processor 340 may then control the operation of its rendering device 350 to function similar to the rendering device 250 of the simulative container 110 and/or transmit the processed data through the transmitter 330 back to the simulative container 110 such that the processor 240 can control the operation of the rendering device 250 and/or the light source 310 according to the processed data by the processor 340. In other words, the simulative container 110 alone, or the external computing device 390 alone, or a combination of the simulative container 110 with an external computing device 390 may process the measured data, i.e. charge amount or speed of charging/discharging, to determine the proximity of the person to the simulative container 110 and to control the rendering device (whether of the simulative container 110 or external thereto, i.e. rendering device 350) and/or control the light source 310 based on the positioning/proximity of the person with respect to the simulative container 110.

The embodiments of FIGS. 3A-3B are described with respect to the person handling the simulative container being one plate of the capacitor and the surface of the simulative container being another plate of the capacitor for illustration purposes and should not be construed as limiting the scope of the embodiments. For example, a person handling the simulative container may wear a glove (coated with metallic material) that acts as one plate of the capacitor and the surface of the simulative container as another plate of the capacitor. In another implementation, a person handling simulative container may wear a ring that is magnetic and that interacts with the simulative container as the person moves with respect to the simulative container. In one nonlimiting example, the magnetic ring may cause current to flow in the electrical circuit disposed on the surface of the simulative container or within the simulative container as the person wearing the magnetic ring moves (e.g., gets closer, moves away from, etc.) with respect to the simulative container. The generated current may be detected, e.g., using a switch that closes, or electrical charges stored on a capacitor of the electrical circuit may increase/decrease as the user moves, etc., to indicate that the person is getting closer or is touching the simulative container. It is appreciated that the changes in the electrical charges (increase/decrease) in the electrical circuit (e.g., capacitor within the circuit) or current flowing through the electrical circuit (e.g., may charge/discharge capacitor, close/open switch, etc.) may be used by the processor to generate appropriate feedback, e.g., click rate, sounding alarm, providing clues, etc. The generated feedback is sent to the output device for rendition to the user. As such, the embodiments that are described with respect to capacitive charging/discharging are for illustrative purposes and should not be construed as limiting the scope of the embodiments.

Referring now to FIG. 4, another simulation system to provide feedback for training safe handling of radioactive material in accordance with some embodiments is depicted. FIG. 4 is similar to that of FIG. 3B except that the entire processing of the measured data and any output, e.g., click rate, alarm, etc., is by an external computing device 390, i.e., transmitter 330 with processor 340 and the rendering device 350. In other words, the simulative container 110 in this example merely makes the necessary measurements, e.g., the amount of electrical charge, the speed of charging/discharging, etc. The measured data is transmitted via the transmitter 320 to the transmitter 330 of the external computing device 390 for processing by the processor 340. The processor 340 may then control the operation of the rendering device 350, similar to that of FIGS. 2A-2C, as described above.

The embodiment of FIG. 4 is described with respect to the person handling the simulative container being one plate of the capacitor and the surface of the simulative container being another plate of the capacitor for illustration purposes and should not be construed as limiting the scope of the embodiments. For example, a person handling the simulative container may wear a glove (coated with metallic material) that acts as one plate of the capacitor and the surface of the simulative container as another plate of the capacitor. In another implementation, a person handling simulative container may wear a ring that is magnetic and that interacts with the simulative container as the person moves with respect to the simulative container. In one nonlimiting example, the magnetic ring may cause current to flow in the electrical circuit disposed on the surface of the simulative container or within the simulative container as the person wearing the magnetic ring moves (e.g., gets closer, moves away from, etc.) with respect to the simulative container. The generated current may be detected, e.g., using a switch that closes, or electrical charges stored on a capacitor of the electrical circuit may increase/decrease as the user moves, etc., to indicate that the person is getting closer or is touching the simulative container. It is appreciated that the changes in the electrical charges (increase/decrease) in the electrical circuit (e.g., capacitor within the circuit) or current flowing through the electrical circuit (e.g., may charge/discharge capacitor, close/open switch, etc.) may be used by the processor to generate appropriate feedback, e.g., click rate, sounding alarm, providing clues, etc. The generated feedback is sent to the output device for rendition to the user. As such, the embodiments that are described with respect to capacitive charging/discharging are for illustrative purposes and should not be construed as limiting the scope of the embodiments.

Figure 5:
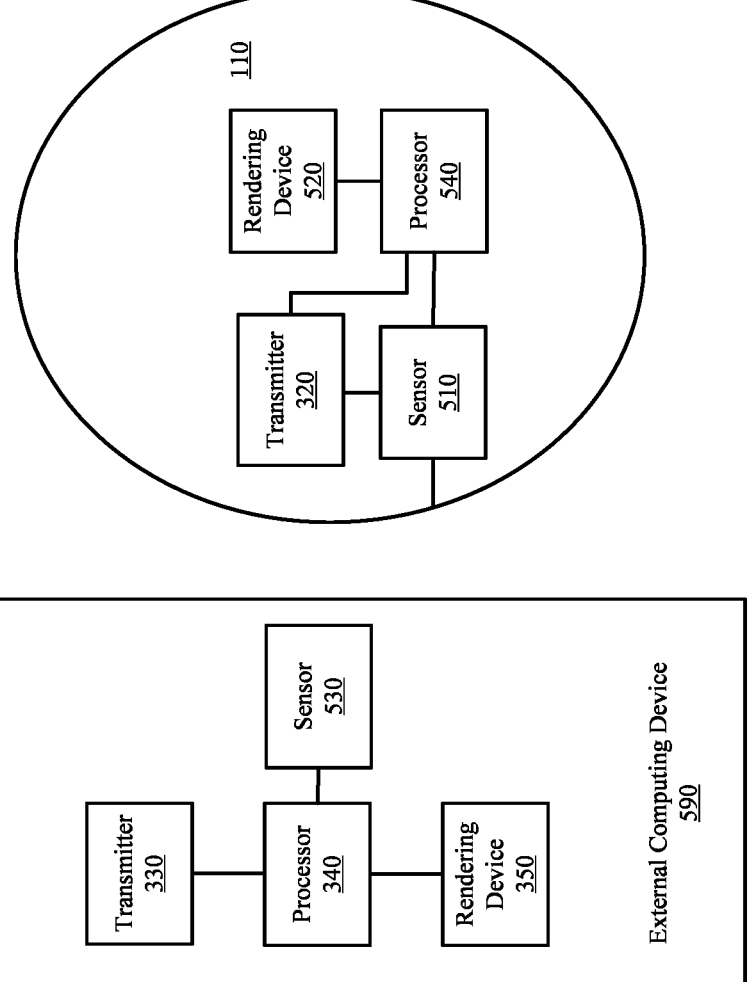
FIG. 5 depicts another simulation system utilizing a non-capacitive sensor to provide feedback for training safe handling of radioactive material in accordance with some embodiments.

FIG. 5 depicts another simulation system utilizing a non-capacitive sensor to provide feedback for training safe handling of radioactive material in accordance with some embodiments. It is appreciated that use of capacitive element as a sensor, as described above with respect to FIGS. 1A-4, is for illustrative purposes and should not be construed as limiting the scope of the embodiments. For example, an optical detector such as a camera or other optical devices such as laser may be used as a sensor. In one nonlimiting example, the simulative container 110 includes a sensor 510, e.g., camera, infrared detector, a laser source/detector, etc. The simulative container 110 may also include a processor 540 and a rendering device 520 that operate substantially similar to the processor 240 and the rendering device 350. In this nonlimiting example, the sensor 510 using optics may determine the proximity of the person approaching or moving away from the simulative container 110. The processor 540 similar to the processor 240 processes the measure data, in this case optical information, to determine the proximity of the person and/or the speed and/or angle at which the person is approaching or moving away from the simulative container 110. As such, the processor 540 may control the operation of the rendering device 520 similar to FIGS. 2A-4.

It is appreciated that in some embodiments, similar to FIGS. 3A-4, an external computing device 590 may also be used for processing the measured information. In this non-limiting example, the external computing device 590 also includes a sensor 530. The sensor 530 may be similar to that of sensor 510 in order to provide a different viewing angle such that a proximity of the person can be measured and processed. The simulative container 110 alone, the external computing device 590, or a combination of the two may be used to measure and process data associated with the proximity of the person with respect to the simulative container 110, the speed and/or angle at which the person is moving toward or moving away from the simulative container 110, etc. The processed information can be used by the processor 540, or processor 340, or a combination thereof to control one or more rendering device 350 and/or 520. Accordingly, a mechanism different from the capacitive element mechanism is used to determine the proximity of the person and in order to provide feedback, e.g., click rates, alarm, light, cues to the person, etc.

The embodiment of FIG. 5 is described with respect to the person handling the simulative container being one plate of the capacitor and the surface of the simulative container being another plate of the capacitor for illustration purposes and should not be construed as limiting the scope of the embodiments. For example, a person handling the simulative container may wear a glove (coated with metallic material) that acts as one plate of the capacitor and the surface of the simulative container as another plate of the capacitor. In another implementation, a person handling simulative container may wear a ring that is magnetic and that interacts with the simulative container as the person moves with respect to the simulative container. In one nonlimiting example, the magnetic ring may cause current to flow in the electrical circuit disposed on the surface of the simulative container or within the simulative container as the person wearing the magnetic ring moves (e.g., gets closer, moves away from, etc.) with respect to the simulative container. The generated current may be detected, e.g., using a switch that closes, or electrical charges stored on a capacitor of the electrical circuit may increase/decrease as the user moves, etc., to indicate that the person is getting closer or is touching the simulative container. It is appreciated that the changes in the electrical charges (increase/decrease) in the electrical circuit (e.g., capacitor within the circuit) or current flowing through the electrical circuit (e.g., may charge/discharge capacitor, close/open switch, etc.) may be used by the processor to generate appropriate feedback, e.g., click rate, sounding alarm, providing clues, etc. The generated feedback is sent to the output device for rendition to the user. As such, the embodiments that are described with respect to capacitive charging/discharging are for illustrative purposes and should not be construed as limiting the scope of the embodiments.

FIG. 6 shows a nonlimiting example of a flow diagram to provide feedback for training safe handling of radioactive material in accordance with some embodiments. At step 610, a capacitor disposed on or over a surface of a simulative container is powered. The simulative container is filled with material other than radioactive material, e.g., inert material/gas. At step 620, a charging/discharging associated with the capacitor is measured as a user moves with respect to the simulative container. At step 630, the measured charging/discharging is processed to determine a proximity of the user with respect to the simulative container. It is appreciated that a processor may create a rolling average of the charging/discharging and that the processing may be based on the rolling average. At step 640, a feedback is rendered to the user based on the proximity of the user with respect to the simulative container. It is appreciated that in some nonlimiting examples, the speed of the charging/discharging is measured. In one nonlimiting example, the rendering includes an audio click rate that increases in frequency as the user moves closer with respect to the simulative container and decreases in frequency as the user moves away with respect to the simulative container. In yet another nonlimiting example, the rendering includes an audio click rate that increases in frequency based on a speed that the user moves closer with respect to the simulative container and decreases in frequency based on a speed that the user moves away from the simulative container. In yet another nonlimiting example, the rendering includes an audio feedback cue instructing the user on how to approach the simulative container. It is appreciated that in some embodiments, the rendering includes turning on a light, e.g., a blue light, on the simulative container. According to some embodiments, the light is flashing and a frequency of the flashing depends on the proximity of the user with respect to the simulative container. In one nonlimiting example, the rendering includes sounding an alarm.

Figure 7:
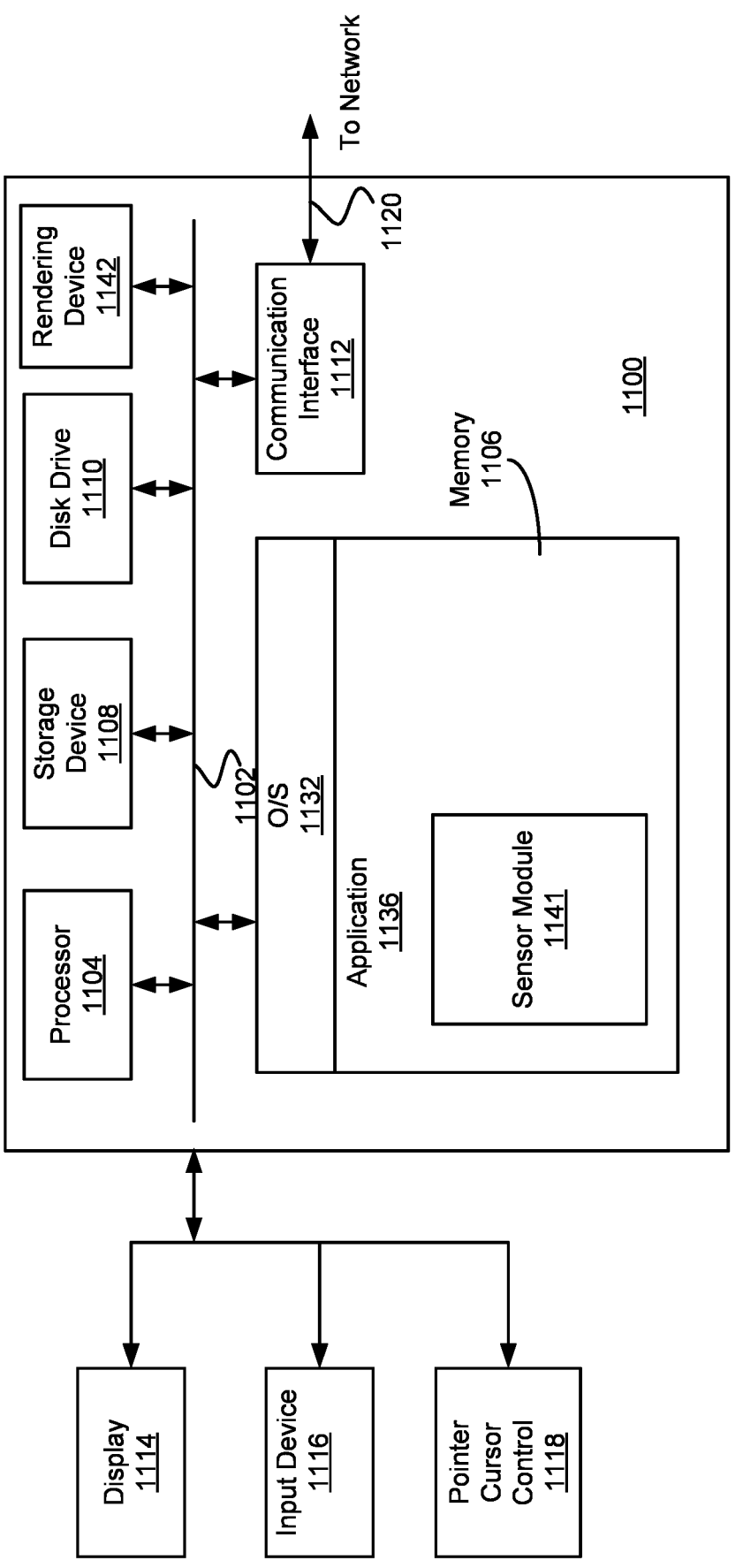
FIG. 7 shows a block diagram depicting an example of a computer system suitable for processing data and providing feedback for training safe handling of radioactive material in accordance with some embodiments.

FIG. 7 shows a block diagram depicting an example of computer system suitable for processing data and providing feedback for raining safe handling of radioactive material in accordance with some embodiments. In some examples, computer system 1100 can be used to implement computer programs, applications, methods, processes, or other software to perform the above-described techniques and to realize the structures described herein. Computer system 1100 includes a bus 1102 or other communication mechanism for communicating information, which interconnects subsystems and devices, such as a processor 1104, a system memory ("memory") 1106, a storage device 1108 (e.g., ROM), a disk drive 1110 (e.g., magnetic or optical), a communication interface 1112 (e.g., modem or Ethernet card), a display 1114 (e.g., CRT or LCD), an input device 1116 (e.g., keyboard), and a pointer cursor control 1118 (e.g., mouse or trackball). In one embodiment, pointer cursor control 1118 invokes one or more commands that, at least in part, modify the rules stored, for example in memory 1106, to define the electronic message preview process.

According to some examples, computer system 1100 performs specific operations in which processor 1104 executes one or more sequences of one or more instructions stored in system memory 1106. Such instructions can be read into system memory 1106 from another computer readable medium, such as static storage device 1108 or disk drive 1110. In some examples, hard-wired circuitry can be used in place of or in combination with software instructions for implementation. In the example shown, system memory 1106 includes modules of executable instructions for implementing an operating system ("OS") 1132, an application 1136 (e.g., a host, server, web services-based, distributed (i.e., enterprise) application programming interface ("API"), program, procedure or others). Further, application 1136 includes a module of executable instructions associated with sensor module 1141 to measure data, e.g., capacitive charge, discharge/charge rate, optical data, etc., associated with a person's proximity to the simulative container, as described above. The processor 1104 may process the measured data in order to control the operation of one or more rendering devices, e.g., display 1114 and/or rendering device 1142.

The term "computer readable medium" refers, at least in one embodiment, to any medium that participates in providing instructions to processor 1104 for execution. Such a medium can take many forms, including but not limited to, non-volatile media, volatile media, and transmission media. Non-volatile media includes, for example, optical or magnetic disks, such as disk drive 1110. Volatile media includes dynamic memory, such as system memory 1106. Transmission media includes coaxial cables, copper wire, and fiber optics, including wires that comprise bus 1102. Transmission media can also take the form of acoustic or light waves, such as those generated during radio wave and infrared data communications.

Common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, electromagnetic waveforms, or any other medium from which a computer can read.

In some examples, execution of the sequences of instructions can be performed by a single computer system 1100. According to some examples, two or more computer systems 1100 coupled by communication link 1120 (e.g., LAN, PSTN, or wireless network) can perform the sequence of instructions in coordination with one another. Computer system 1100 can transmit and receive messages, data, and instructions, including program code (i.e., application code) through communication link 1120 and communication interface 1112. Received program code can be executed by processor 1104 as it is received, and/or stored in disk drive 1110, or other non-volatile storage for later execution. In one embodiment, system 1100 is implemented as a hand-held device and/or simulative container. But in other embodiments, system 1100 can be implemented as a personal computer (i.e., a desktop computer) or any other computing device. In at least one embodiment, any of the above-described delivery systems can be implemented as a single system 1100 or can implemented in a distributed architecture including multiple systems 1100.

In other examples, the systems, as described above can be implemented from a personal computer, a computing device, a mobile device, a mobile telephone, a facsimile device, a personal digital assistant ("PDA") or other electronic device.

In at least some of the embodiments, the structures and/or functions of any of the above-described interfaces and panels can be implemented in software, hardware, firmware, circuitry, or a combination thereof. Note that the structures and constituent elements shown throughout, as well as their functionality, can be aggregated with one or more other structures or elements.

Alternatively, the elements and their functionality can be subdivided into constituent sub-elements, if any. As software, the above-described techniques can be implemented using various types of programming or formatting languages, frameworks, syntax, applications, protocols, objects, or techniques, including C, Objective C, C++, C #, Flex™, Fireworks®, Java™, Javascript™, AJAX, COBOL, Fortran, ADA, XML, HTML, DHTML, XHTML, HTTP, XMPP, Python, and others. These can be varied and are not limited to the examples or descriptions provided.

The foregoing description of various embodiments of the claimed subject matter has been provided for the purposes of illustration and description. It is not intended to be exhaustive or to limit the claimed subject matter to the precise forms disclosed. Many modifications and variations will be apparent to the practitioner skilled in the art. Embodiments were chosen and described in order to best describe the principles of the invention and its practical application, thereby enabling others skilled in the relevant art to understand the claimed subject matter, the various embodiments and the various modifications that are suited to the particular use contemplated.

What is claimed is:

1. A system comprising:
   a simulative container filled with a material;
   a capacitor disposed on the simulative container, wherein the capacitor is configured to charge and discharge in response to a proximity of a user;
   a power source coupled to the simulative container and configured to power the capacitor;
   a processor configured to generate a feedback in response to a measured charging and discharging of the capacitor as a user moves relative to the simulative container; and
   an output device configured to provide the feedback to the user based on movement of the user relative to the simulative container.

2. The system as described in claim 1, wherein the simulative container is spherical.

3. The system as described in claim 1, wherein the simulative container comprises Tungsten.

4. The system as described in claim 1, wherein the material is inert.

5. The system as described in claim 1, wherein the power source is a 5V power source, and wherein the capacitor is connected to the power source through a resistor ranging between 20 and 40 mega ohms.

6. The system as described in claim 1, wherein a portion of a surface of the simulative container acts as the capacitor.

7. The system as described in claim 1, wherein the processor is configured to measure a speed of the charging and discharging.

8. The system as described in claim 1, wherein the output device is configured to output an auditory click rate that increases in frequency as the user moves closer to the container and decreases in frequency as the user moves away from the simulative container.

9. The system as described in claim 1, wherein the output device is configured to output an auditory click rate that changes in frequency based on a speed that the user moves relative to the simulative container.

10. The system as described in claim 1, wherein the output device is a light source.

11. The system as described in claim 10, wherein the light is blue.

12. The system as described in claim 10, wherein a flashing frequency of the light source depends on a proximity of the user to the simulative container.

13. The system as described in claim 1, wherein the processor is configured to generate a rolling average of the charging and discharging of the capacitor, and wherein the output device is configured to provide the feedback based on the rolling average.

14. The system as described in claim 1, wherein the feedback is sounding an auditory or visual alarm.

15. The system as described in claim 1, wherein the feedback is audio feedback as verbal instructions on how the user is to approach the simulative container.

16. The system as described in claim 1 further comprising a glove coated with metallic material that is worn by the user and wherein the glove acts as one plate of the capacitor and wherein a surface of the simulative container acts as another plate of the capacitor.

17. The system as described in claim 1 further comprising a magnetic ring that is worn by the user, wherein the magnetic ring generates current on the simulative container as the magnetic ring moves with respect to the simulative container, and wherein the generated current causes the capacitor to charge and discharge based on proximity of the user and movement with respect to the simulative container.

18. A system comprising:

a simulative container filled with a material;

a sensor configured to sense a position or movement of a user with respect to the simulative container;

a processor configured to determine the position and the movement of the user with respect to the simulative container, wherein the determining is based on sensed data from the sensor; and an output device configured to provide feedback to the user based on movement of the user relative to the simulative container.

19. The system as described in claim 18, wherein the sensor is one of a light detection and ranging (LIDAR), inductive sensing, radio frequency (RF) sensing, microwave sensing, and radar sensing.

20. A system comprising:

a simulative container filled with a material, wherein the simulative container includes an electrical circuitry that increases/decreases electrical charges or causes electrical charges to flow in response to a proximity of a user with respect to the simulative container;

a power source coupled to the simulative container and configured to power the electrical circuitry;

a processor configured to generate a feedback in response to a measured increases/decreases in electrical charge or the electrical charges flow as the user moves relative to the simulative container; and an output device configured to provide the feedback to the user based on movement of the user relative to the simulative container.

* * * * *